(12) United States Patent
Kerawala

(10) Patent No.: US 10,474,331 B1
(45) Date of Patent: Nov. 12, 2019

(54) APPARATUS, SOFTWARE, SYSTEMS AND METHODS FOR USE IN PREVENTING ELECTRONIC MESSAGES FROM BEING SENT TO UNINTENDED RECIPIENTS

(71) Applicant: SAKS INNOVATIVE L.L.C., Bellevue, WA (US)

(72) Inventor: Amir Kerawala, Bellevue, WA (US)

(73) Assignee: SAKS INNOVATIVE L.L.C., Bellevue, WA (US)

( * ) Notice: Subject to any disclaimer, the term of this patent is extended or adjusted under 35 U.S.C. 154(b) by 148 days.

(21) Appl. No.: 14/520,324

(22) Filed: Oct. 21, 2014

Related U.S. Application Data

(60) Provisional application No. 61/893,806, filed on Oct. 21, 2013, provisional application No. 61/984,011, filed on Apr. 24, 2014.

(51) Int. Cl.
| | |
|---|---|
| *G06F 17/00* | (2019.01) |
| *G06F 3/0484* | (2013.01) |
| *G06F 17/24* | (2006.01) |
| *G06Q 10/10* | (2012.01) |
| *G06F 3/0481* | (2013.01) |

(52) U.S. Cl.
CPC .......... *G06F 3/0484* (2013.01); *G06F 17/241* (2013.01); *G06Q 10/107* (2013.01); *G06F 3/0481* (2013.01); *G06F 3/04842* (2013.01); *G06F 3/04845* (2013.01); *G06F 2211/006* (2013.01)

(58) Field of Classification Search
CPC ........ G06F 15/16; G06F 17/30; G06F 3/0484; G06F 17/241; G06F 2211/006; G06F 3/04845; G06F 3/04842; G06F 3/0481; G09G 5/00; G06Q 10/107
USPC .......................... 709/206; 345/609; 715/230
See application file for complete search history.

(56) References Cited

U.S. PATENT DOCUMENTS

| | | | |
|---|---|---|---|
| 6,449,635 B1 * | 9/2002 | Tilden, Jr. ............... | H04L 29/06 709/201 |
| 6,671,718 B1 * | 12/2003 | Meister ................ | G06Q 10/107 709/201 |
| 8,745,538 B2 * | 6/2014 | Tsui ...................... | H04M 1/236 715/751 |
| 9,250,770 B2 * | 2/2016 | Choi ..................... | G06F 3/0238 |
| 2003/0060240 A1 * | 3/2003 | Graham ............... | G06Q 10/107 455/566 |

(Continued)

OTHER PUBLICATIONS

Lync'2010: Screenshots of Microsoft Lync 2010 with release notes which is published on Jan. 27, 2011.*

(Continued)

*Primary Examiner* — Cesar B Paula
*Assistant Examiner* — David Faber
(74) *Attorney, Agent, or Firm* — DWC Law Firm, P.S.; David Chen

(57) ABSTRACT

Smart devices, software, systems and methods for use in avoiding errors in designated electronic message recipients. In some embodiments, addressee identifying indicia, such as photographs, names, custom notations, or any combination thereof, are displayed in lieu of, overlapping, or proximate graphical send buttons for use in initiating transmission of electronic messages. In some embodiments, message content is monitored and compared against past messages exchanged to identify content discrepancies.

16 Claims, 9 Drawing Sheets

(56) References Cited

U.S. PATENT DOCUMENTS

| | | | |
|---|---|---|---|
| 2004/0199588 A1* | 10/2004 | Keohane | G06Q 10/107 709/206 |
| 2006/0026244 A1* | 2/2006 | Watson | G06Q 10/107 709/206 |
| 2006/0190542 A1* | 8/2006 | Rhoades | G06Q 10/107 709/206 |
| 2007/0005708 A1* | 1/2007 | Juliano | G06Q 10/00 709/206 |
| 2007/0005713 A1* | 1/2007 | LeVasseur | H04L 63/126 709/206 |
| 2008/0162649 A1* | 7/2008 | Lee | G06Q 10/107 709/206 |
| 2009/0164588 A1* | 6/2009 | D'Amato | G06F 16/93 709/206 |
| 2011/0148916 A1* | 6/2011 | Blattner | G06Q 10/107 345/619 |
| 2013/0198296 A1* | 8/2013 | Roy | G06Q 10/107 709/206 |
| 2013/0254308 A1* | 9/2013 | Rose | H04N 21/252 709/206 |

OTHER PUBLICATIONS

Microsoft Office Support, ("Add, change, or remove a picture for a contact in Outlook," https://support.office.com/en-us/article/add-change-or-remove-a-picture-for-a-contact-in-outlook-1717939b-6b15-48b5-a7b8-1effe238b3f3, Outlook'2007.*

Slovak "Outlook 2003 commandbar with word editor", http://www.outlookcode.com/codedetail_print.aspx?id=2027.*

Blitzer, "Send Tracked Pardot Email Templates from Saleforce.com", published online at https://www.pardot.com/new-features/send-tracked-pardot-email-templates-salesforcecom/, on Dec. 17, 2012 (Year: 2012).*

"Gmail: Sending, replying, attachments, and printing", Feb. 6, 2013, 9 pages.*

* cited by examiner

US 10,474,331 B1

APPARATUS, SOFTWARE, SYSTEMS AND METHODS FOR USE IN PREVENTING ELECTRONIC MESSAGES FROM BEING SENT TO UNINTENDED RECIPIENTS

BACKGROUND

1. Technical Field

The following disclosure relates to preventing errors in the sending of electronic messages.

2. Related Art

Text messages, email, and other electronic communication methods and systems provide convenient and quick means for transmitting information in personal and business matters. The speed with which information can be distributed electronically has a profound effect on the world, but also enhances potential impacts of human errors in communication. For example, the volume and speed with which people can process electronic communications can increase potential volume of, and likelihood of, errors in communications.

In 2014, a major US financial services corporation filed a complaint in court seeking an order that an email service provider delete an email that was mistakenly sent to a stranger account. The complainant asserted that the order was needed to avert a "needless and massive" breach of privacy, and that the email contained "highly confidential brokerage account information." This is just one example of an email mistake with potentially massive adverse consequences. Email mistakes, such as, for example, listing incorrect addressees, are common mistakes that can be made by people in all walks of life, in business and personal matters. Such errors can sometimes have catastrophic consequences in business or personal matters.

BRIEF SUMMARY

In some embodiments, a smart device is provided for use in electronic communications, the smart device having a processor configured to cause display of addressee identifying indicia in lieu of, overlapping, or proximate a graphical send button for use in initiating transmission of an electronic message. The identifying indicia is indicia in addition to a communication address or any indicia automatically populated in an addressee line in a communication software user interface provided on the smart device. Furthermore, the sender can be provided with selectable options usable in a graphical user interface to modify the identifying indicia.

In some embodiments, the addressee identifying indicia is displayed within 1 inch of the graphical send button.

In some embodiments, the addressee identifying indicia is displayed below message content of the electronic message.

In some embodiments, the addressee identifying indicia is a photograph or graphic associated with the communication address currently listed in the addressee line.

In some embodiments, the addressee identifying indicia is a name associated with the communication address currently listed in the addressee line.

In some embodiments, the addressee identifying indicia is a user selected notation associated with the communication address currently listed in the addressee line.

In some embodiments, the processor is provided within instruction for use in identifying an individual name in a body of message content if that individual name is used in the message content in a manner that signifies the name as the intended recipient, and for comparing the individual name with name data associated with a communication address designated for a current electronic message, and for notifying the sender if there is a discrepancy between the identified individual name and the individual name associated with the communication address.

In some embodiments, the processor is provided within instruction for providing a graphical user interface mode for receiving one or more sensitive terms selected by a user and monitoring electronic messages to determine if any of the sensitive terms exist in the electronic message before it is transmitted and if any of the sensitive terms exist in the electronic message, determining if any of the same sensitive terms has been used in past electronic message exchanges with the same recipient, and if not, notifying the sender to obtain verification that the sender intended to send the message to the identified communication address.

Methods for using the various embodiments of the smart device, and for modifying communications software associated with the smart device are also provided.

DETAILED DESCRIPTION

Figure 1:
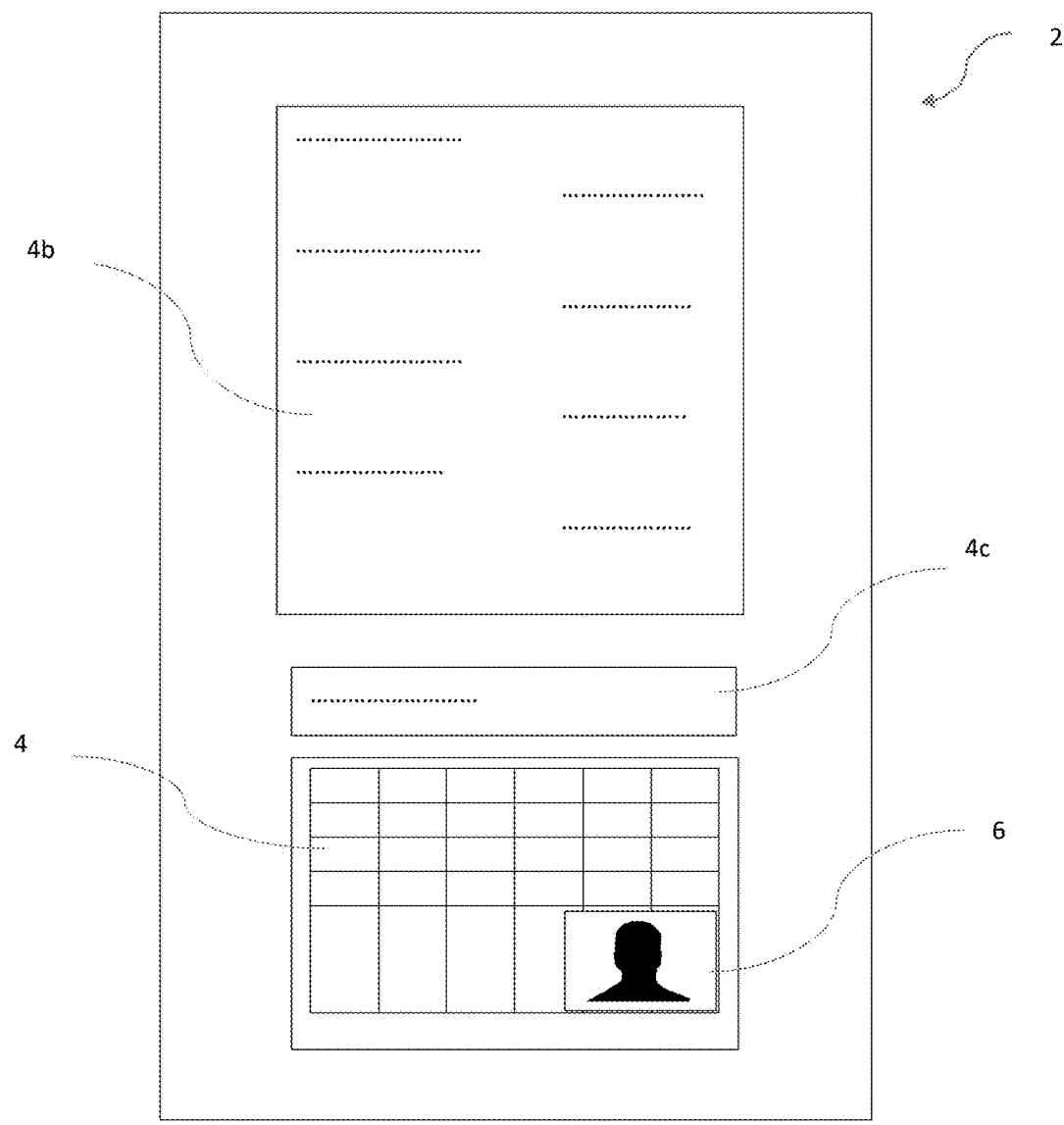
FIG. 1 shows an example smart phone for an embodiment of the present disclosure, with touch screen keyboard, and a text message display screen, having a graphical actuator used for initiating sending of messages.

In the following description, certain specific details are set forth in order to provide a thorough understanding of various embodiments of the present disclosure. However, upon reading this disclosure, one skilled in the art will understand that the disclosure may be practiced without many of these details. In other instances, well-known structures, systems and methods associated with smart devices such as computers, smart phones and other communications devices, and communications networks, have not been described in detail to avoid unnecessarily obscuring the descriptions of the embodiments of the disclosure.

Throughout various portions of the following description, the embodiments of the present disclosure are described in the context of application to SMS (e.g., text messages), MMS, email or instant messages of various types, which can be collectively or individually referred to herein as "electronic messages." However, as will be understood by one skilled in the art after reviewing this disclosure, various embodiments of the present disclosure may have a wide variety of applications in other contexts not expressly enumerated, such as, for example, in any type of user interface in which the content entered by a user is being sent to another user, and in which there is one or more intended recipients. Various embodiments of the present disclosure are described in the context of a software application usable for modifying, or supplementing, various communications software to achieve the features of the embodiments disclosed herein. However, for each of the features described, it is contemplated that in some embodiments, the user interface features presented in the present disclosure can also be provided as an original component of the communications software, rather than a modification or supplementation.

As used herein, the term "communication address" or "address" can include phone numbers, email addresses, or any other communication or network address usable to identify a location to which to transmit information, such as, an electronic message.

The term, computer readable medium, does not include "transitory waves or signals."

In the present description, where used, the terms "about" and "consisting essentially of" mean±20% of the indicated range, value, or structure, unless otherwise indicated. It should be understood that the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, which terms and variants thereof are intended to be construed as non-limiting.

In some embodiments of the present disclosure, a system usable for sending electronic messages is provided. The system can include a plurality of user smart devices, which can be, for example, smart phones, tablets, or computers, all in communications with a communications network, such as a wireless communications network or the Internet or both. As well be appreciated by those skilled in the art after reviewing this disclosure, the electronic messages can be sent via the Internet, cellular networks, a combination thereof, and may also in some situations, involve a cloud based or other type of host based communication network wherein messages are retrieved from a host by a recipient after having been sent by a sender (e.g., social network website or various types of email services).

Referring to FIG. 1, some embodiments of the present disclosure include a smart phone 2 (or other smart device) with SMS (text message) and/or MMS capabilities (hereinafter also collectively referred to as "text message," unless otherwise expressly indicated), with associated graphical user interface software having a modified send button 6 for initiating transmission of messages, a touch screen graphical key pad 4, a display portion 4b showing historical messages, and a current message field 4c (for showing a message being created, or modified, waiting to be sent).

Various embodiments of the present disclosure comprise a software application that can be installed on the smart phone 2, or other smart devices as referenced herein, to modify, or supplement, an underlying graphical user interface of text message software installed on the smart device, or other communications software and associated user interfaces (e.g., email). As used herein, the terms "modifying," "modification," "supplementing," or the like, can include not only changing, or replacing, the graphical user interface or elements thereof, displayed by the communications software, but also, or alternatively, overlaying graphics above all or portions of the user interface for the communications software.

Figure 5:
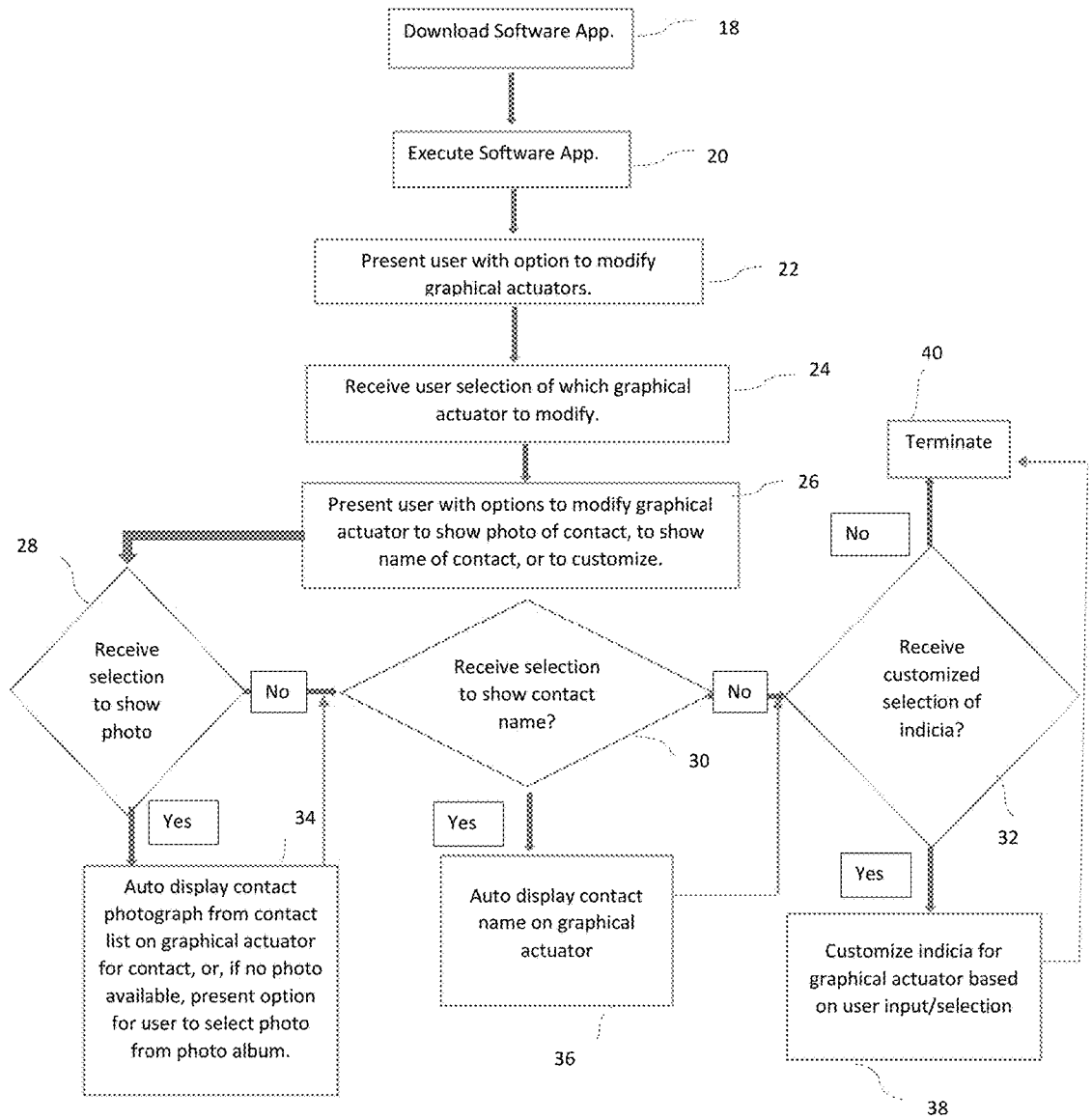
FIG. 5 shows a flow diagram for some aspects of some embodiments of the present disclosure.

Referring to FIGS. 1 & 5, in some embodiments, a modification provided by the present disclosure, can comprise providing a user selectable option to modify graphical send buttons (e.g., graphical actuators used to initiate sending of messages), or to otherwise label a send button with a photo or name from the user's smart device contact list or photo album. The modification can include, for example, displaying addressee identifying indicia (e.g., names, notation, photos or a combination thereof) on or proximate the send button. In some embodiments, the addressee identifying indicia herein can be displayed within one (1) centimeter or one (1) inch of the send button, or closer to the send button, or within two (2) centimeters or two (2) inches from the send button, or further than one (1) centimeter or one (1) inch from the send button. In other embodiments, the identifying indicia described herein is displayed in lieu of, or overlapping the graphical send button, or the send button can otherwise comprise or consist of the identifying indicia.

For example, referring to FIG. 5, in some embodiments, a user can download the software application (step 18) of present disclosure, which can then be executed (step 20) to present the user with an option to modify send buttons (step 22) on the user's text message software. The user can then select to modify a particular send button, or other graphical actuator (step 24), after which, the graphical user interface of the user's smart phone can then present the user with an option to select to associate a photograph or a name from a contact list, or to enter a particular note or to select a combination of graphical indicia (name from contact list, photo from contact list, or notation, or a combination thereof). (step 26). For example, a user can select to automatically associate the photo from the contact list, in which case, when a phone number is selected for text message purposes, the photo, if any, associated with that phone number in the user's contact list will be displayed on or proximate the text message send button (steps 28 and 34). Also, a user can instead, or in addition, select to automatically associate a name from the user's contact list on the user's smart phone, in which case, when a phone number is selected for text message purposes, the name, if any, associated with that phone number in the user's contact list, will be displayed on or proximate the text message send button (steps 30 and 36). Also, a user can select to custom modify a display for the send button, such that the user can select one or more of the above options for the photograph or contact name, plus input any notation or import any other graphic available on the user's smart device, for display on or near the send button, in any combination (steps 32 and 38). That is, for example, customizing the display for the send button, or otherwise, custom modifying the send button, can comprise displaying on or near the send button, two or more stored addressee identifying indicia (e.g., addressee name and photo), or a user created indicia (e.g., a notation), or a graphic image, or a combination of any of these. The process that is illustrated in FIG. 5 may terminate at step 40.

Figure 4:
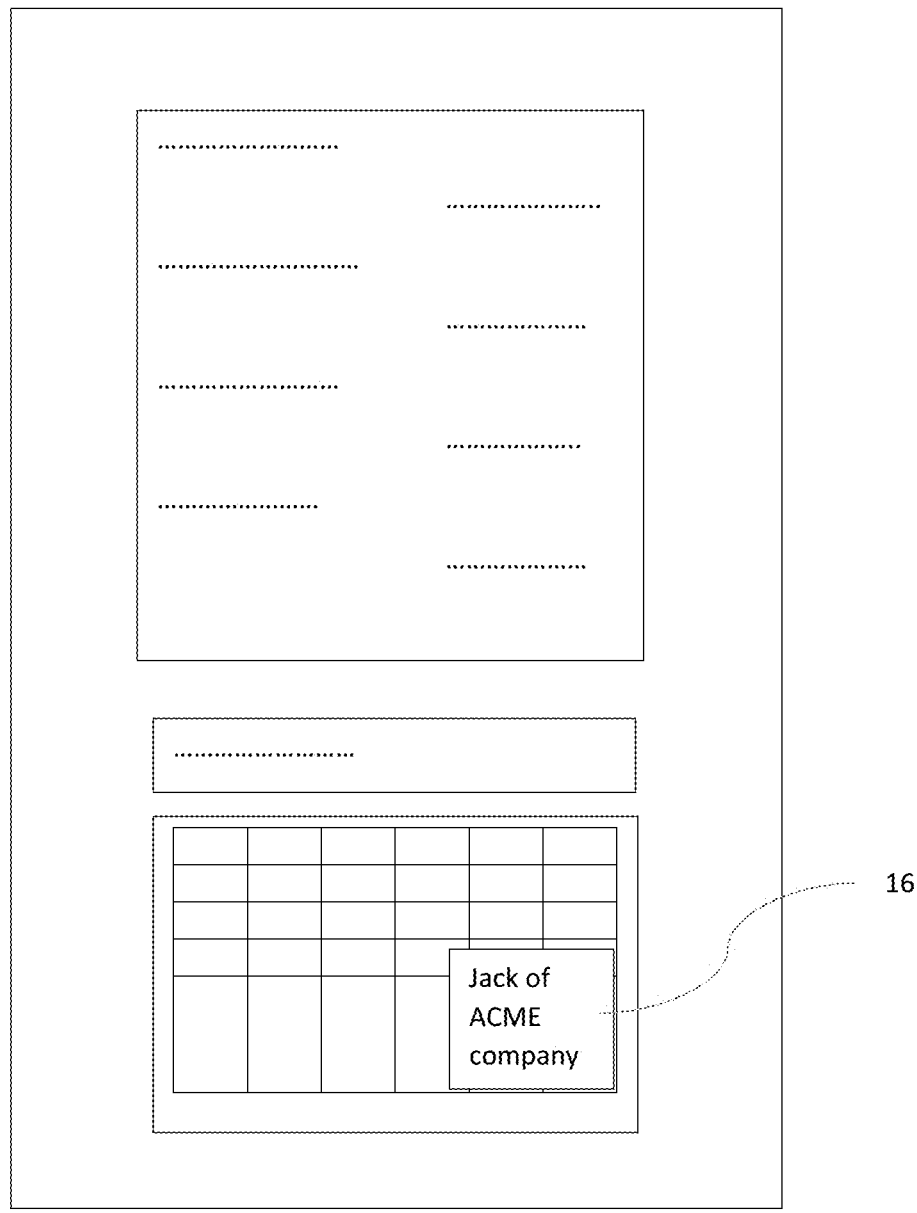
FIG. 4 shows another embodiment of the smart phone of FIG. 1, with an alternative indicia on the graphical actuator used for initiating sending of messages.

FIG. 4 shows an example embodiment where the send button 16 is custom modified to show a user notation. In particular, the send button 16 has been modified to show text representing the name of an individual and a company for which the individual works, such that if the user of the smart phone knows more than one user by that name, or a similar name, the combination of the user's first name and name of the company may instantly inform the user of the specific identity of the person presented being addressed.

In some embodiments, the modifications/supplementations described above may be selected to be implemented for one or more particular communications software applications.

Figure 2:
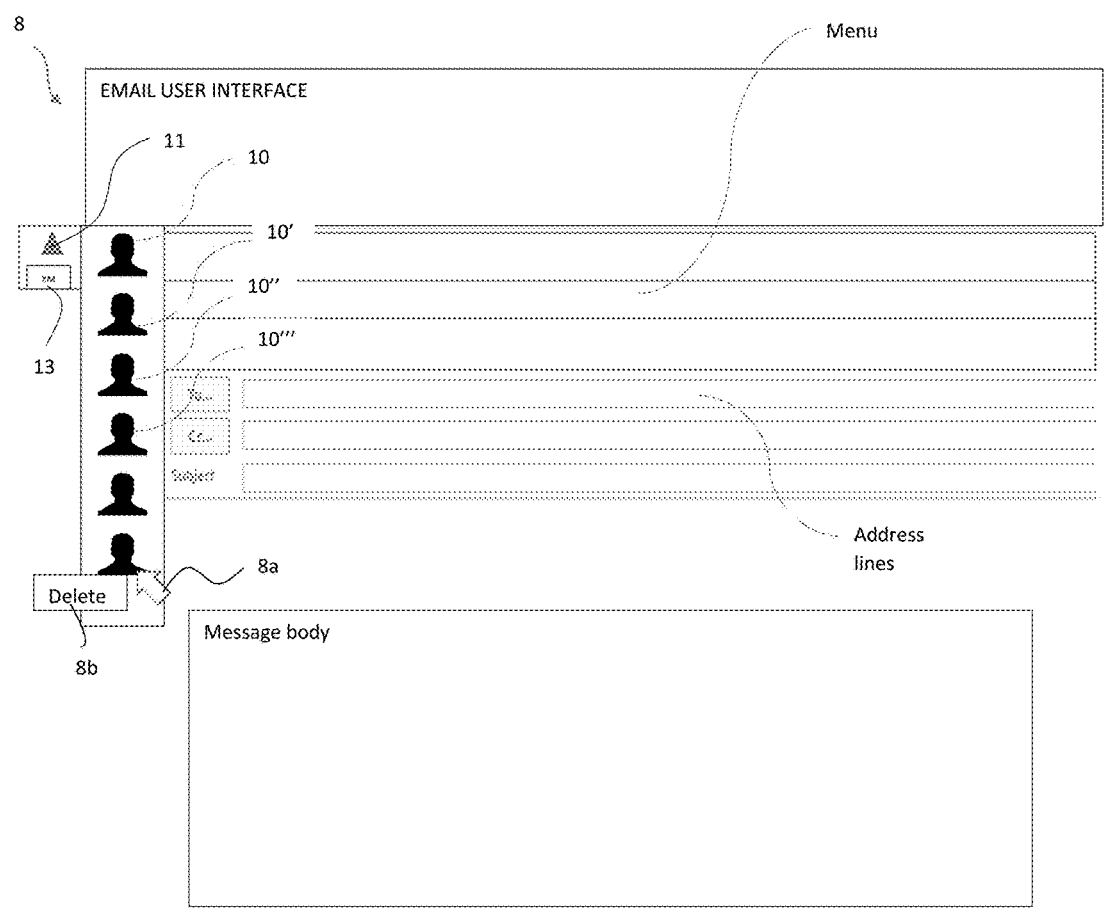
FIG. 2 shows an example communications user interface mode, such as from an email user interface, for some embodiments of the present disclosure, having a graphical actuator used for initiating sending of messages.

Referring to FIG. 2, in some embodiments, an email user interface 8 (which can also be an interface for other communications systems, such as, for example, SMS or social network communication interface) is provided which can comprise a send button 10. The send button 10 for the email user interface can be modified, such as by, in a manner similar to that described above for the text message user interface, to display identifying indicia on or near the send button, the identifying indicia identifying a selected addressee. The identifying indicia can be, for example, a photo of the addressee, name of the addressee (both of which can be automatically displayed due to association with the email address stored in the user smart device, or otherwise previously received with incoming email from the addressee), and/or can also include name of an organization 13 (which can include companies, non-profits, or other affiliations like family or religion, etc.), with which the addressee is affiliated, and/or other identifying indicia associated with the organization, such as a logo 11. The identifying information associated with the organization can be stored in association with the addressee's email address. That is, when an email address of the addressee is selected to which to send an electronic message, the identifying indicia is displayed.

Figure 6:
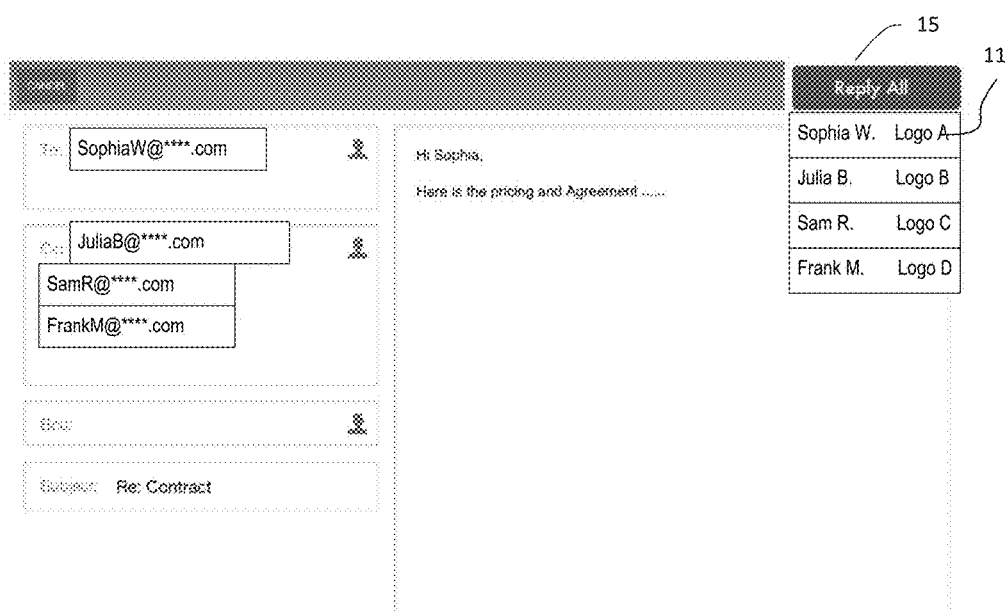
FIG. 6 shows an example communication interface mode in which a user has selected to reply to all recipients and a sender on an email, for some embodiments of the present disclosure.
Figure 7:
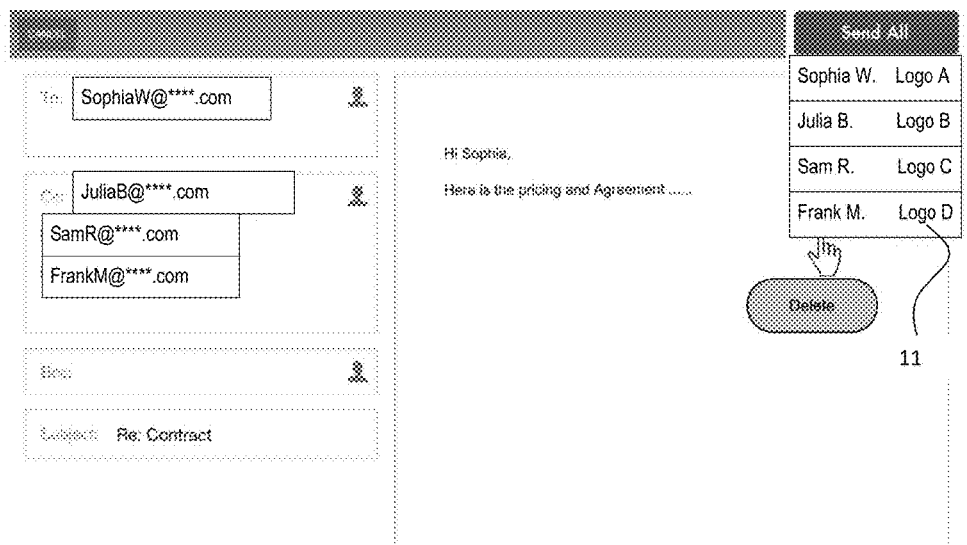
FIG. 7 shows an example communication interface mode in which a user has selected to send a message to multiple recipients on an email, for some embodiments of the present disclosure.

Furthermore, in addition to the identifying indicia displayed for the first, or main, addressee in FIG. 2, a plurality of send buttons 10, or a plurality of identifying indicia having same or similar identifying indicia to that as the send button for the first or main addressee of the email, can be shown, one for each addressee, in which the addressees, other than the main addressee, can be listed on the main addressee line, the cc: line, and/or the bcc: line. As will be appreciated by those skilled in the art upon review of this disclosure, some user communication interfaces (e.g., emails) provide for a "reply all" function 15, or analogous function, in which a single button or other indicia can be actuated to generate a communication interface mode in which multiple addressee's are listed, which can include one or more main addressees (e.g., in a TO: line) and/or one or more copy addressees (e.g., in the cc: line). See, e.g., FIG. 6. Alternatively, or in supplement, the user can manually enter multiple addressees as intended recipients. See, e.g., FIG. 7. FIG. 2 illustrates some graphical user interface elements that can be present as part of those interfaces illustrated in FIG. 6 and FIG. 7 (e.g., for each one of the addressees in any line, identifying indicia can be displayed, such as, for example, name of an organization, photograph, logo, customized indicia, name of individual addressee, etc.).

In some embodiments of the present disclosure, each of, or some of the, the addressees, can be automatically displayed as shown in FIG. 2, adjacent or proximate a send button, similar to send button 10 for the main addressee. That is, each addressee can be associated with a separate send button (e.g., 10', 10", 10''' . . . ) and each of the send buttons for the additional addressees can also automatically display identifying indicia such as name of the addressee, a photo for the addressee, name of affiliated organization, and associated logo or other graphic. In some embodiments, a user must actuate (e.g., touch) each send button for each addressee before the email is sent to confirm all addressees, while in some embodiments, the user only has to actuate the first send button, or one of the send buttons, or a group send button (not illustrated) (e.g., a REPLY ALL button or a SEND ALL button), which can be positioned proximate identifying indicia for at least the first addressee, or another addressee. The communication interface can be selectively configured by a user to require the user to select each send button for each addressee before each addressee is sent the communication, or to initiate transmission to all listed addressees when the user selects a single button like, for example, a REPLY ALL or SEND ALL button. In some embodiments, the user can configure the communications interface of the present disclosure to send the communication upon a single touch actuation (e.g., touching the send button for the main addressee or touching the send buttons as a group), or require the user to actuate, or otherwise select, each send button to confirm all addressees on all address lines.

In some embodiments, a user may touch one or more send buttons 10, 10', 10", etc., or identifying indicia, among a plurality of addressees, to delete or remove the addressee. For example, the email user interface 8 may be configured such that, when a user touches, or otherwise selects the position of the send button, the user can double click or can slide the cursor 8a (or a stylus or finger, etc) across the send button 10 to cause indicia to appear, such as a graphical "delete" indicia or button 8b, which the user can then select to delete the addressee. In a smart phone, or tablet for example, the user can slide her finger across the addressee to reveal the "delete" indicia, which she can then touch or otherwise select to delete the particular addressee associated with the send button 10 for which the delete indicia appeared.

Figure 3:
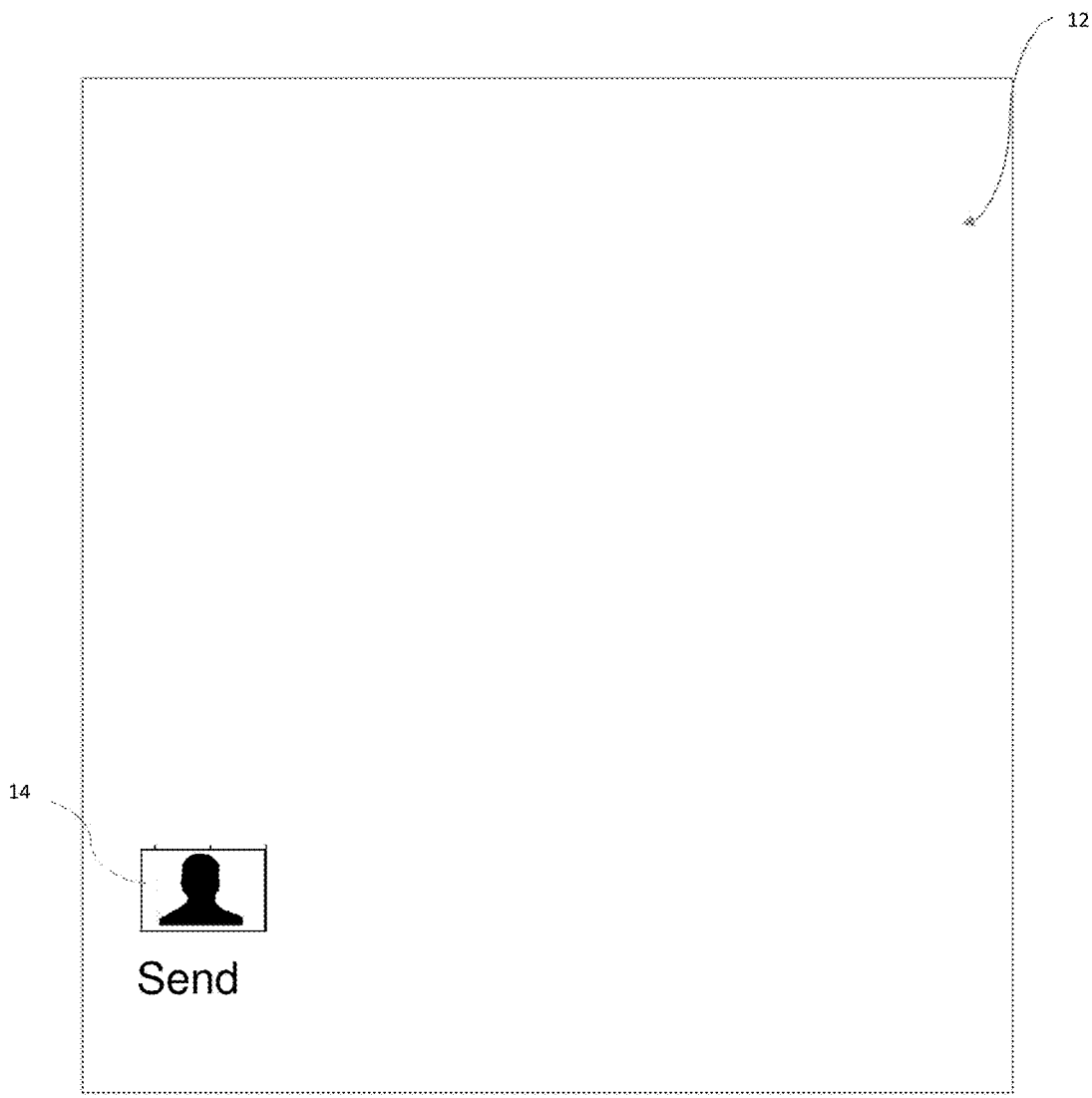
FIG. 3 shows a simplified example user interface for any of a variety of smart devices and/or software applications, for some embodiments of the present disclosure, such as an email application on a tablet, wherein the content displayed on the user interface may be sent to another party by touching a graphical actuator having identifying indicia.

Referring to FIG. 3, in some embodiments of the present disclosure, a smart phone, tablet, PC or laptop (or other smart device) is provided having a user interface 12 for sending an electronic message. Some current user interfaces for smart devices are set up such that, as the length of the message grows, the selected addressee identifying indicia scrolls away and is not visible. The software of the present disclosure can be provided on the smart device to display a send button 14 having addressee identifying indicia. The modified or supplemental send button can be positioned by a user by sliding or otherwise positioning the send button on a location on the display screen that a user desires. The modified or supplemental send button can be continuously visible, and can be actuated (e.g., by touch) when a user is ready to send the electronic message to the user identified by the send button.

In some embodiments, the graphical actuator or send button, for any of the send buttons described herein, can provide alternating display graphics, or flash, such as, for example, flashing between addressee identifying indicia as modified and the original pre-modified send button. Alternatively, the addressee identifying indicia can flash between dark and light, or between colors, as will be appreciate by those skilled in the art after reviewing the present disclosure. In some embodiments, the flashing can be applied to the main addressee, or to all addressees. Also, in some embodiments, the post-modified or post-supplemented send button, can still display part or all of the original send button, or alternatively, display the original term indicating it to be a send button (e.g., SEND), in addition to the identifying indicia.

Also, in some embodiments, wherein a supplemental or additional send button is provided that displays addressee identifying indicia, the additional send button can be visible and "float" at a user selected location on the display screen, with or without obscuring an original send button associated with the communications software in use.

The described software, methods and systems involving modification or supplementation of graphical actuators provide a manner in which a user of a smart device can be given conspicuous notice of the identity of addressees currently selected, by photos, names, personalized notations, and/or a combination thereof, to help prevent human error in sending messages to unintended recipients.

Furthermore, in some embodiments of the present disclosure, software, methods and systems are provided for notifying an electronic message sender of content discrepancies. For example, in some embodiments, if a phone number or email address is selected in via an underlying communications software for sending an electronic message, an individual's name or designation used in the body of the message or email as an addressee (e.g., "hi bob" in the first line of the email or text message) can be automatically compared against name(s) or designations associated with the communications address (e.g., phone number or email address) of the designated addressee in the address line, by cross-reference against the smart device contact directory, to assist in verifying if the correct addressee is being designated. As such, in some embodiments, a contact directory of a user's smart device can include a "nick names" field, where the user can enter nick names in the contact directory, in addition to formal names (e.g., full names, first name and last name, or first name, last name and middle initial), in case the user addresses a person by nick name in emails. If a discrepancy is noted between an addressee name or designation in the body or subject line of an electronic message and a contact directory listing (e.g., formal names, and nick names) associated with the addressee in the address line (phone number or email address field), the sender can be automatically notified for verification before a messages is sent. The addressee name or designation in the body of the electronic message can be located by, for example, the positioning of the name or designation near the top of the message (e.g., first line of text, or first few lines of text) or by being proximate an introduction word (e.g., hello, dear, hi, etc). Verification may comprise, for example, the user interface presenting text and graphics to the sender, asking the sender to touch a graphical button to verify correct addressee information, which may include presenting a photo (or other identifying indicia) of the current addressee to the sender to ask the user to verify whether that is the sender's intent.

Also, for example, in some embodiments, proper nouns, proper names, or reference numbers (e.g., any string of numbers) referenced in electronic message exchanges between a sender and a designated recipient within a designated period of time, such as, for example, in the past 180 days, or longer in some embodiments, are automatically compared against all appearances of the proper nouns, proper names or numbers in a current message body. Moreover, the user can select to make these comparisons, and select the comparison to be specific to either number string, or the proper names/nouns, or in some embodiments, the user can even select specific words or numbers to check. For example, if a certain reference number, has never been mentioned previously in exchanges with the addressee over the designated search period (e.g., 180 days, or longer or shorter depending on user selection), a sender may be automatically informed by notice requiring confirmation by the sender of the addressee information, before the electronic message can be sent. Alternatively, if the current proper nouns and proper names have never been mentioned previously, the smart device by instruction of the software of the present disclosure, can search other electronic message exchanges with other addressees to determine if the proper nouns/names were mentioned in any such other exchanges, and then if so, automatically ask the sender to verify if any of the other addressee's were the intended addressee instead by presenting those addressees. In some embodiments, the verification message presented to the sender will only ask the sender to verify the addressee, either by presenting full name of addressee or photograph, and allow the sender to select to view other suggested addressees (i.e., prior recipients of messages that discussed the same proper names or proper nouns). As will be understood by those skilled in art after reviewing this disclosure, in some embodiments, any of the various features for sensing discrepancy in message content can be selected to be ignored or turned off by a user at any time.

In some embodiments, the user of a smart device can select specific terms to be observed by the smart device via the software of the present invention, for monitoring content discrepancies. For example, a user may enter words that the user only uses with a narrow set of addressees. This can include personal relationship words like "love" or "honey," or it can be business terminology which is very specific, such as, for example, secret project code names, (e.g., HAWK project), or terms, etc. The software of the present disclosure can instruct the smart device such that each time such words appear in an electronic message, the smart device can display a request for verification message to the sender before sending the message. For example, the verification message can indicate to the sender that the sender has used a word, and can identify the word, and ask the user to verify the addressee by displaying a photo of the addressee, a full name of the addressee, a notation/indicia associated with the addressee (e.g., John of ACME company), or a combination thereof. Alternatively, in some embodiments, the software of the present disclosure may be configured to seek such configuration only if specific terms identified by the sender in configuration or setup, have not be previously used with the current addressee. In these manners, the present system, methods, apparatus and software can provide a manner in which to help minimize disastrous mistakes in addressees in business or other confidential contexts, or to help minimize embarrassing situations where personal emails or other messages are sent to unintended recipients (e.g., sending "I love you," to your boss).

Figure 8:
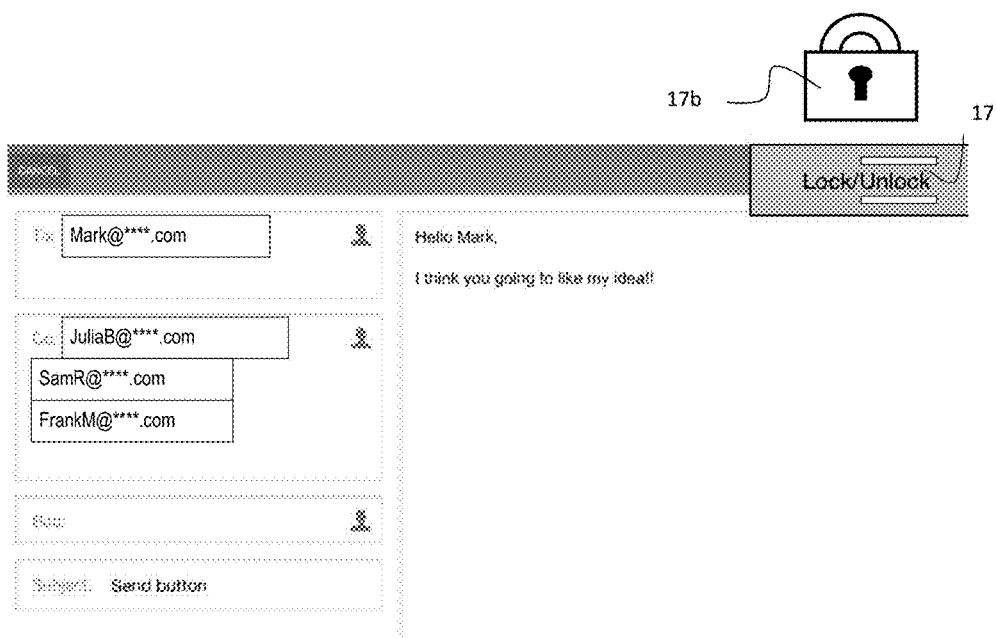
FIG. 8 shows an example communication interface mode for some embodiments of the present disclosure in which a message is locked from transmission, or in which a message can be locked from transmission.

Referring to FIG. 8, in some embodiments of the present disclosure, lock functions are provided. For example, when a user selects within a communication interface to reply all, the communication interface can display lock indicia 17 showing that send functions are locked, and display indicia that the user can select to unlock the send function. The indicia for use in locking and unlocking can be the same, or can be proximate one another. When the user selects to unlock, then the communication interface can reveal previously hidden send buttons, or other indicia associated with addressees, which be selected to transmit the communication, such as described above in connection with FIGS. 2, 6 and 7. Alternatively, when the sending functions are locked, the send buttons or other indicia selectable to send a message are not hidden, but are inactive. In some embodiments, the user can re-lock the communication interface to prevent accidentally sending the communication, by selecting the lock indicia 17 (which may be the same or proximate indicia as for unlock).

In some embodiments, a default state of a communication interface is to lock sending. A user can then indicate addressees or type a message, but the user can be required to select to unlock the sending functions of the communications interface before selecting send buttons or other indicia for use in sending a communication.

In some embodiments of the present disclosure, the lock indicia 17 can include a graphical indicia 17b in the design of a lock, such as, for example, a bolt lock for a door, or a padlock (See, e.g., FIG. 8) of the type used to lock gates or bicycle chains. When a user selects to lock or unlock the message, the graphical indicia 17b can simulate movement of a lock by digitally displaying movement, from a locked to unlocked position, or from an unlocked to locked position. An audio transmission can also accompany the movement so the that the user can hear, for example, a lock clicking sound when the user selects to lock the transmission or message, or when the transmission or message is otherwise locked. An audio transmission can also accompanying movement when the lock is being unlocked, which may imitate the sound of a lock being opened, or otherwise unlocked. These audio and graphical images can be effective in drawing attention from the user to be cautious about sending a communication before being sent, in general.

Figure 9:
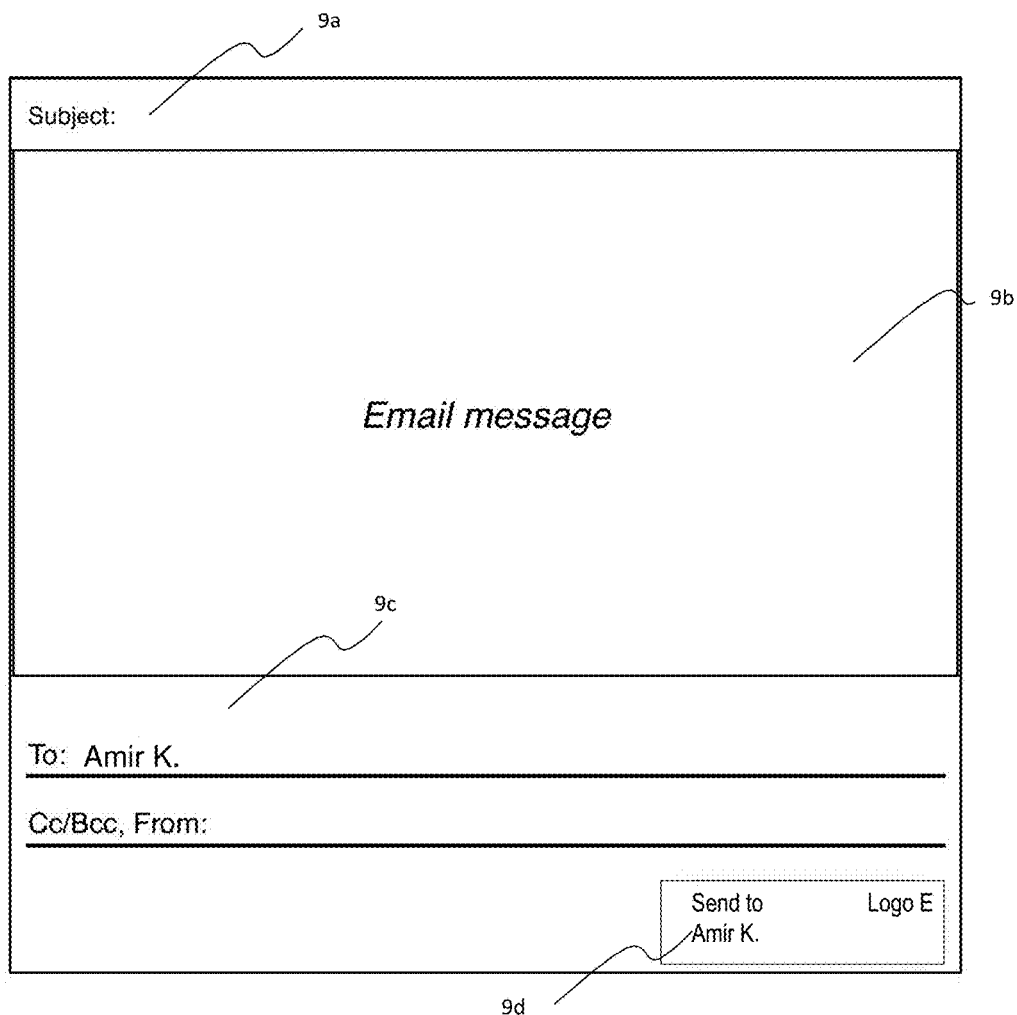
FIG. 9 shows an example communication interface mode for some embodiments of the present disclosure in which a recipient address field is disposed below a message field.

Referring to FIG. 9, in some embodiments of the present disclosure, a communication interface is provided that is configured to encourage a user to type an email address last. For example, in the interface displayed, the subject line 9a for the email address is displayed at the top of the interface, followed by the body of the message 9b. The email address lines(s) 9c are the last field, or bottom, field. This can help prevent inadvertent sending during typing of an email or other communication, since the user will preferably not enter an email address until the message has been fully drafted. Furthermore, one or more modified or supplemented send buttons 9d can be provided, such as, for example, send buttons including identifying indicia similar to one or more of the send buttons described above for various embodiments of the present disclosure.

Although specific embodiments and examples of the disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described devices, software, systems and methods can omit some elements or acts, can add other elements or acts, or can combine the elements or execute the acts in a different order than that illustrated, to achieve various advantages of the disclosure. These and other changes can be made to the disclosure in light of the above detailed description.

In general, in the following claims, the terms used should not be construed to limit the disclosure to the specific embodiments disclosed in the specification. Accordingly, the invention is not limited by the disclosure, but instead its scope is determined entirely by the following claims.

What is claimed is:

1. A computer implemented method of preventing electronic mail messages from being sent to unintended recipients, the method comprising:

displaying a graphical send button for use by a sender to cause transmission of an electronic mail message, the graphical send button including unique addressee identifying indicia displayed thereon associated with a currently selected addressee selected to receive transmission of the electronic mail message upon the graphical send button being used by the sender, the unique addressee identifying indicia being uniquely associated with, and specifically signifying, the currently selected addressee prior to selection of the currently selected addressee within an electronic mail message system used by the sender;

wherein the unique addressee identifying indicia is displayed in addition to a communication address for the currently selected addressee or in addition to any indicia automatically populated in an addressee line in a communication software user interface when the communication address is provided in the addressee line;

wherein the currently selected addressee is an individual addressee and the unique addressee identifying indicia includes a photograph or other non-textual graphic image uniquely associated with the individual addressee; and providing the sender with selectable options to modify the graphical send button by changing the unique addressee identifying indicia.

2. The computer implemented method of claim 1 wherein the graphical send button with the unique addressee identifying indicia displayed thereon is displayed below message content of the electronic mail message.

3. The computer implemented method of claim 1 wherein the unique addressee identifying indicia includes a name uniquely associated with the currently selected addressee.

4. The computer implemented method of claim 1 wherein the unique addressee identifying indicia includes a user selected notation uniquely associated with the currently selected addressee.

5. The computer implemented method of claim 1 further comprising:

identifying an individual name in a typed body of message content if that individual name is used in the message content in a manner that signifies the name as the intended recipient, and comparing the individual name with name data associated with the currently selected addressee and notifying the sender if there is a discrepancy between the identified individual name and the name data associated with the currently selected addressee.

6. The computer implemented method of claim 1 further comprising:

receiving one or more sensitive terms;

monitoring electronic mail messages to determine if one or more sensitive terms exist in the electronic mail message as a typed term before the electronic mail message is transmitted; and if the one or more sensitive terms exists in the electronic mail message as a typed term, determining if the same one or more sensitive terms has been used in past electronic message exchanges with the same currently selected addressee, and if not, notifying the sender to obtain verification that the sender intended to send the electronic mail message to the currently selected addressee.

7. A smart device for use in electronic mail communications comprising:
a memory;
a display; and
a processor configured to:
cause display of a graphical send button for use in causing transmission of an electronic mail message, the graphical send button including unique addressee identifying indicia located thereon, the unique addressee identifying indicia being continuously uniquely associated with a currently selected addressee within an electronic mail message system used by sender of the electronic mail message until and unless the processor is instructed by user input to change the unique addressee identifying indicia, the currently selected addressee being selected to receive the electronic mail message upon the graphical send button being used by the sender, wherein the unique addressee identifying indicia is displayed in addition to a communication address for the currently selected addressee or in addition to any indicia automatically populated in an addressee line in a communication software user interface when a communication address for the currently selected addressee is input into the addressee line, and wherein the currently selected addressee is an individual addressee and the unique addressee identifying indicia includes a photograph or other non-textual graphic image uniquely associated with the individual addressee; and
provide the sender with selectable options usable in a graphical user interface to modify the graphical send button by changing the unique addressee identifying indicia.

8. The smart device of claim 7 wherein the graphical send button with the unique addressee identifying indicia displayed thereon is displayed below message content of the electronic mail message.

9. The smart device of claim 7 wherein the unique addressee identifying indicia includes a name uniquely associated with the currently selected addressee.

10. The smart device of claim 7 wherein the unique addressee identifying indicia includes a user selected notation uniquely associated with the currently selected addressee.

11. The smart device of claim 7 wherein the processor is provided within instruction for use in identifying an individual name in a typed body of message content if that individual name is used in the message content in a manner that signifies the name as the intended recipient, and for comparing the individual name with name data associated with the currently selected addressee, and for notifying the sender if there is a discrepancy between the identified individual name and the name data associated with the currently selected addressee.

12. The smart device of claim 7 wherein the processor is provided with instruction for providing a graphical user interface mode for receiving one or more sensitive terms selected by a user and monitoring electronic mail messages to determine if any of the one or more sensitive terms exist in the electronic mail message as a typed term before it is transmitted and if any of the one or more sensitive terms exists in the electronic mail message as a typed term, determining if any of the same one or more sensitive terms has been used in past electronic mail message exchanges with the same currently selected addressee, and if not, notifying the sender to obtain verification that the sender intended to send the electronic mail message to the currently selected addressee.

13. A non-transitory computer readable medium comprising instruction for use on a computing device, the instructions being usable to execute a method of preventing electronic mail messages from being sent to unintended recipients, the method comprising:
displaying a graphical send button for use in causing transmission of an electronic mail message, the graphical send button including unique addressee identifying indicia displayed thereon, the unique addressee identifying indicia being continuously uniquely associated with, and specifically signifying, a currently selected addressee within an electronic mail message system used by sender of the electronic mail message until and unless the computing device is instructed by user input to change the unique addressee identifying indicia, the currently selected addressee being selected to receive the electronic mail message upon the graphical send button being used by the sender;
wherein the unique addressee identifying indicia is displayed in addition to a communication address or in addition to any indicia automatically populated in an addressee line in a communication software user interface when a communication address for the currently selected addressee is input into the addressee line;
wherein the currently selected addressee is an individual addressee and the unique addressee identifying indicia includes a photograph or other non-textual graphic image uniquely associated with the individual addressee; and
providing the sender with selectable options to modify the graphical send button by changing the unique addressee identifying indicia.

14. The non-transitory computer readable medium of claim 13, wherein the graphical send button with the unique addressee identifying indicia is displayed in a flashing manner such that the unique addressee identifying indicia is intermittently displayed.

15. The non-transitory computer readable medium of claim 14, wherein the unique addressee identifying indicia is displayed in a flashing manner such that the graphical send button with the unique addressee identifying indicia is displayed alternatively with a graphical send button without the unique addressee identifying indicia.

16. The non-transitory computer readable medium of claim 14, wherein the graphical send button with the unique addressee identifying indicia is displayed in a flashing manner such that the unique addressee identifying indicia is displayed flashing in different colors.

* * * * *